(12) United States Patent
Iwase et al.

(10) Patent No.: US 7,763,214 B2
(45) Date of Patent: Jul. 27, 2010

(54) REDUCING AGENT FORMING DEVICE AND EXHAUST GAS CONTROL SYSTEM USING THE SAME

(75) Inventors: Katsunori Iwase, Kariya (JP); Tetsuo Toyama, Chiryu (JP); Shigeru Ooyanagi, Kariya (JP); Yoshiaki Nishijima, Toyokawa (JP); Masahiro Okajima, Kariya (JP)

(73) Assignee: Denso Corporation, Kariya (JP)

( * ) Notice: Subject to any disclaimer, the term of this patent is extended or adjusted under 35 U.S.C. 154(b) by 975 days.

(21) Appl. No.: 11/525,867

(22) Filed: Sep. 25, 2006

(65) Prior Publication Data

US 2007/0068144 A1    Mar. 29, 2007

(30) Foreign Application Priority Data

Sep. 26, 2005  (JP) .............................. 2005-277421
Jun. 5, 2006   (JP) .............................. 2006-156236

(51) Int. Cl.
*B01D 50/00*   (2006.01)
*F01N 3/00*    (2006.01)

(52) U.S. Cl. ................. 422/177; 422/182; 422/183; 60/286; 60/288

(58) Field of Classification Search ............ 60/286, 60/288; 48/198.7, 127.9, 127.7, 198.8; 422/170, 422/177, 182, 183
See application file for complete search history.

(56) References Cited

U.S. PATENT DOCUMENTS

| 6,367,246 | B1 | 4/2002 | Hirota et al. | |
| 6,397,582 | B1* | 6/2002 | Hanaoka et al. | 60/274 |
| 6,739,125 | B1* | 5/2004 | Mulligan | 60/286 |
| 6,810,658 | B2* | 11/2004 | Kaupert et al. | 60/274 |
| 7,049,008 | B2* | 5/2006 | Ito et al. | 428/662 |
| 7,051,518 | B2* | 5/2006 | Benz et al. | 60/286 |

(Continued)

FOREIGN PATENT DOCUMENTS

JP    5-68887    3/1993

(Continued)

OTHER PUBLICATIONS

Shimizu et al, "Catalytic performance of Ag-Al$_2$O$_3$ catalyst for the selective catalytic reduction of NO by higher hydrocarbons", Applied Catalysis B: Environmental 25:239-247 (2000).

(Continued)

*Primary Examiner*—N. Bhat
(74) *Attorney, Agent, or Firm*—Nixon & Vanderhye, PC

(57) ABSTRACT

A reforming device includes a reforming part that subjects a hydrocarbon-based raw material to be reformed to a reforming reaction to form a reducing agent to be supplied to a reducing catalyst for reducing nitrogen oxide selectively. The reforming part has a reforming reaction region through which the raw material to be reformed passes and is reacted with supplied hydrogen atoms supplied so as to be reformed to the reducing agent. For example, a hydrogen permeable membrane having a first surface and a second surface may be provided in the reforming part to permeate hydrogen atoms from the first surface to the second surface and to produce the hydrogen atoms on the second surface. The reforming device can be suitably used for an exhaust gas control system for cleaning exhaust gas, for example.

17 Claims, 11 Drawing Sheets

U.S. PATENT DOCUMENTS

| | | | |
|---|---|---|---|
| 7,181,906 B2 * | 2/2007 | Dalla Betta et al. | 60/286 |
| 7,204,082 B1 * | 4/2007 | MacBain et al. | 60/286 |
| 7,390,347 B2 * | 6/2008 | Kusakabe et al. | 95/45 |
| 7,559,195 B2 * | 7/2009 | Riegger et al. | 60/286 |
| 2004/0177606 A1 | 9/2004 | Scharsack | |

FOREIGN PATENT DOCUMENTS

| | | |
|---|---|---|
| JP | 5-133218 | 5/1993 |
| JP | 7-227523 | 8/1995 |
| JP | 2003-286828 | 10/2003 |

OTHER PUBLICATIONS

Preprints of Technology Conference No. 29-04, Society of Automotive Engineers of Japan—partial translation.

* cited by examiner

FIG. 14

| | SIMULATION LIGHT OIL | SUPPLY GAS N2 | FORMATION RATE OF REDUCING AGENT $\times 10^{-4}$ [ml/min/cm$^2$] | |
|---|---|---|---|---|
| | | | TEMP.:140°C | TEMP.:200°C |
| FIRST EXAMPLE | A | N2 | 0.64 | 2.0 |
| | B | N2 | | 0.9 |
| | C | N2 | | 0.8 |

SIMULATION LIGHT OIL
A: N-HEXADECANE SIMPLE SUBSTANCE
B: MIXED LIQUID OF N-TRIDECANE AND N-HEXADECANE (1:1)
C: MIXED LIQUID OF N-TRIDECANE, N-HEXADECANE AND NAPHTHALENE (2:2:1)

FIG. 15

| | SIMULATION LIGHT OIL | SUPPLY GAS O2 | FORMATION RATE OF REDUCING AGENT $\times 10^{-4}$ [ml/min/cm$^2$] | |
|---|---|---|---|---|
| | | | TEMP.:140°C | TEMP.:200°C |
| SECOND EXAMPLE | A | O2 | 1.1 | 6.2 |
| | B | O2 | | 4.3 |
| | C | O2 | | 2.5 |

SIMULATION LIGHT OIL
A: N-HEXADECANE SIMPLE SUBSTANCE
B: MIXED LIQUID OF N-TRIDECANE AND N-HEXADECANE (1:1)
C: MIXED LIQUID OF N-TRIDECANE, N-HEXADECANE AND NAPHTHALENE (2:2:1)

REDUCING AGENT FORMING DEVICE AND EXHAUST GAS CONTROL SYSTEM USING THE SAME

CROSS REFERENCE TO RELATED APPLICATION

This application is based on Japanese Patent Applications No. 2005-277421 filed on Sep. 26, 2005, and No. 2006-156236 filed on Jun. 5, 2006, the contents of which are incorporated herein by reference in its entirety.

FIELD OF THE INVENTION

The present invention relates to a reforming device for forming a reducing agent capable of selectively reducing NOx, and an exhaust gas control system for cleaning exhaust gas of an automobile by the use of a reducing agent formed by this reforming device.

BACKGROUND OF THE INVENTION

Conventionally, technologies for removing NOx in exhaust gas of an internal combustion engine include mainly a method using a three-way catalyst such as a Pt-Rh based catalyst, a selective reducing method using ammonia (JP-A-2003-286826), a selective reducing method using urea or the like (JP-A-2004-529286), a selective reducing method using hydrocarbon (HC) or the like, and a NOx adsorbing method for adsorbing NOx by various kinds of adsorbents (JP patent No. 3248187 corresponding to U.S. Pat. No. 6,367,246).

However, the method using a three-way catalyst does not have any performance of cleaning NOx for an exhaust gas containing a large amount of oxygen such as the exhaust gas of a diesel engine, a lean burn engine of low fuel consumption, or the like. In this manner, the method of using a three-way catalyst presents a problem that the three-way catalyst cannot exert its effect in an oxygen excess atmosphere and cannot remove NOx sufficiently.

Moreover, in the selective reducing method, circumstances are different depending on a reducing agent to be used. When ammonia or urea is used as a reducing agent, there are presented a problem that a tank for the reducing agent is required separately and a problem that a device is enlarged in size. Moreover, the reducing agent needs to be replenished, which lays a burden on a user. Further, there is presented a problem that ammonia is discharged into the atmosphere to cause secondary pollution (ammonia slip). Still further, the NOx adsorbing method presents a problem that NOx adsorbed by an adsorbent needs to be post-treated by rinsing with water or the like.

Consequently, to solve these problems, a copper ion exchange zeolite for catalytically cracking NOx directly into $N_2$, $O_2$ was developed and it was reported that a NOx cleaning rate higher than 90% could be obtained at an experiment stage. This copper ion-exchange zeolite is such that copper is carried on zeolite through ion exchange and has received attention as a reducing catalyst capable of cleaning NOx in an oxygen excess atmosphere and a catalyst device for cleaning exhaust gas having this copper ion-exchange zeolite set in the exhaust system of an engine is already publicly known (JP-A-5-68887).

However, the above-described catalyst device for cleaning exhaust gas does not have sufficient performance of cleaning HC and CO because the copper ion-exchange zeolite is low in the oxidizing ability of a catalyst in an oxygen excess atmosphere in a running automobile. For this reason, pretreatment is required to oxidize CH and CO, which becomes disadvantageous in terms of cost, space, and weight.

In contrast to these methods, in the selective reducing method using hydrocarbon as a reducing agent, a reducing agent can be obtained from the fuel of an internal combustion engine. Therefore, the selective reducing method using hydrocarbon as a reducing agent has received attention from the viewpoint of: eliminating the need for providing a separate tank, which is required in the method using ammonia and urea; reducing the size of a device; and load to be applied to a user. It is said that straight-chain alkane having 8 to 12 carbons is preferable as hydrocarbon used for the reducing agent of NOx (refer to non-patent documents 1,2).

[Non-patent document 1] Preprints of Catalysis Society of Japan, 1999 (3G20)
[Non-patent document 1] Preprints of Technology Conference No. 29-04, Society of Automotive Engineers of Japan Moreover, oxygenated hydrocarbon containing oxygen such as alcohol, ethers, ketones, or the like is used as a reducing agent to reduce NOx and the like (JP-A-7-227523).

However, how to obtain a reducing agent required at the time of selectively reducing NOx in the exhaust gas and made of the above-described hydrocarbon from the fuel of the internal combustion engine becomes a problem. In addition, there is a demand for a technology that is plus in terms of energy balance and can reduce a total of NOx.

SUMMARY OF THE INVENTION

In view of the above-described problems, one object of the present invention is to provide a reforming device for forming a reducing agent capable of selectively reducing NOx. Moreover, another object of the present invention is to obtain a reducing agent used for a selective reduction reaction from an internal combustion engine, in an exhaust gas control system for cleaning the exhaust gas of the internal combustion engine by the selective reduction reaction.

According to an aspect of the present invention, a reforming device includes a reforming part that subjects a hydrocarbon-based raw material to be reformed to a reforming reaction to form a reducing agent to be supplied to a reducing catalyst for reducing nitrogen oxide selectively, and a hydrogen atom supply means for supplying hydrogen atoms to the reforming part. Furthermore, the reforming part has a reforming reaction region through which the raw material to be reformed passes and is reacted with the hydrogen atoms supplied by the hydrogen atom supply means so as to be reformed to the reducing agent. Accordingly, the reducing agent capable of selectively reducing NOx can be effectively obtained.

For example, the hydrogen atom supply means includes a hydrogen permeable membrane having a first surface and a second surface, and the hydrogen permeable membrane permeates hydrogen atoms from the first surface to the second surface to produce the hydrogen atoms on the second surface. In this case, the place to which the raw material to be reformed is supplied can be separate from the place where the hydrogen atoms are generated, thereby reforming the raw material in a liquid state. The reforming reaction region may be within a range of sub-micron from the second surface of the hydrogen permeable membrane.

Furthermore, a hydrogen supply means for supplying hydrogen molecules to the first surface of the hydrogen permeable membrane may be provided. In this case, the hydrogen permeable membrane dissociates the hydrogen molecules supplied to the first surface from the hydrogen supply means into hydrogen atoms and makes the hydrogen atoms permeate itself from the first surface to the second surface to produce the hydrogen atoms on the second surface. For example, the hydrogen supply means includes an electrolytic film through which electric current passes, and water supply means for supplying water to the first surface of the electrolytic film. In this case, when electric current is passed through the electrolytic film, the water supplied from the water supply means is decomposed on the first surface of the electrolytic film through electrolysis to produce hydrogen molecules on the second surface of the electrolytic film and the hydrogen molecules are supplied to the first surface of the hydrogen permeable membrane.

A raw material supply unit may be provided for supplying the raw material to be reformed to the first surface of the hydrogen permeable membrane. In this case, the first surface of the hydrogen permeable membrane may be provided with a hydrogen forming catalyst for forming hydrogen from the raw material to be reformed and a catalyst carrier for carrying the hydrogen forming catalyst. Alternatively, a promoter may be provided on the first surface of the hydrogen permeable membrane, for promoting hydrogen formation by the hydrogen forming catalyst.

In addition, an oxygen supply means for supplying oxygen into the reforming part may be provided. For example, the oxygen supply means is constructed so as to supply oxygen formed through the electrolysis to the reforming part.

Any reforming devices described above may be used for an exhaust gas control system for an internal combustion engine. In this case, the reducing catalyst can be located in the exhaust gas passage, and fuel used for the engine can be used as the raw material to be reformed. Accordingly, by reforming the fuel for the internal combustion engine, the reducing agent for selectively reducing nitrogen oxide in the exhaust gas can be obtained. This can eliminate the need for supplying a reducing agent for a selective reduction reaction from the outside and the need for providing a tank for holding the reducing agent.

The reforming part may be arranged in a fuel tank in which the fuel for the internal combustion engine is stored, or next to the fuel tank. In this case, it is possible to shorten piping for supplying the fuel for the internal combustion engine to the reforming part and to reduce the power of a pump to supply the fuel for the internal combustion engine to the reforming part.

BRIEF DESCRIPTION OF THE DRAWINGS

Additional objects and advantages of the present invention will be more readily apparent from the following detailed description of preferred embodiments when taken together with the accompanying drawings.

FIG. 14 is a view to show experiment results of a first experiment example.

FIG. 15 is a view to show experiment results of a second experiment example.

DETAILED DESCRIPTION OF THE PREFERRED EMBODIMENTS

First Embodiment

Hereinafter, a first embodiment of the present invention will be described on the basis of FIG. 1 to FIG. 4.

Figure 1:
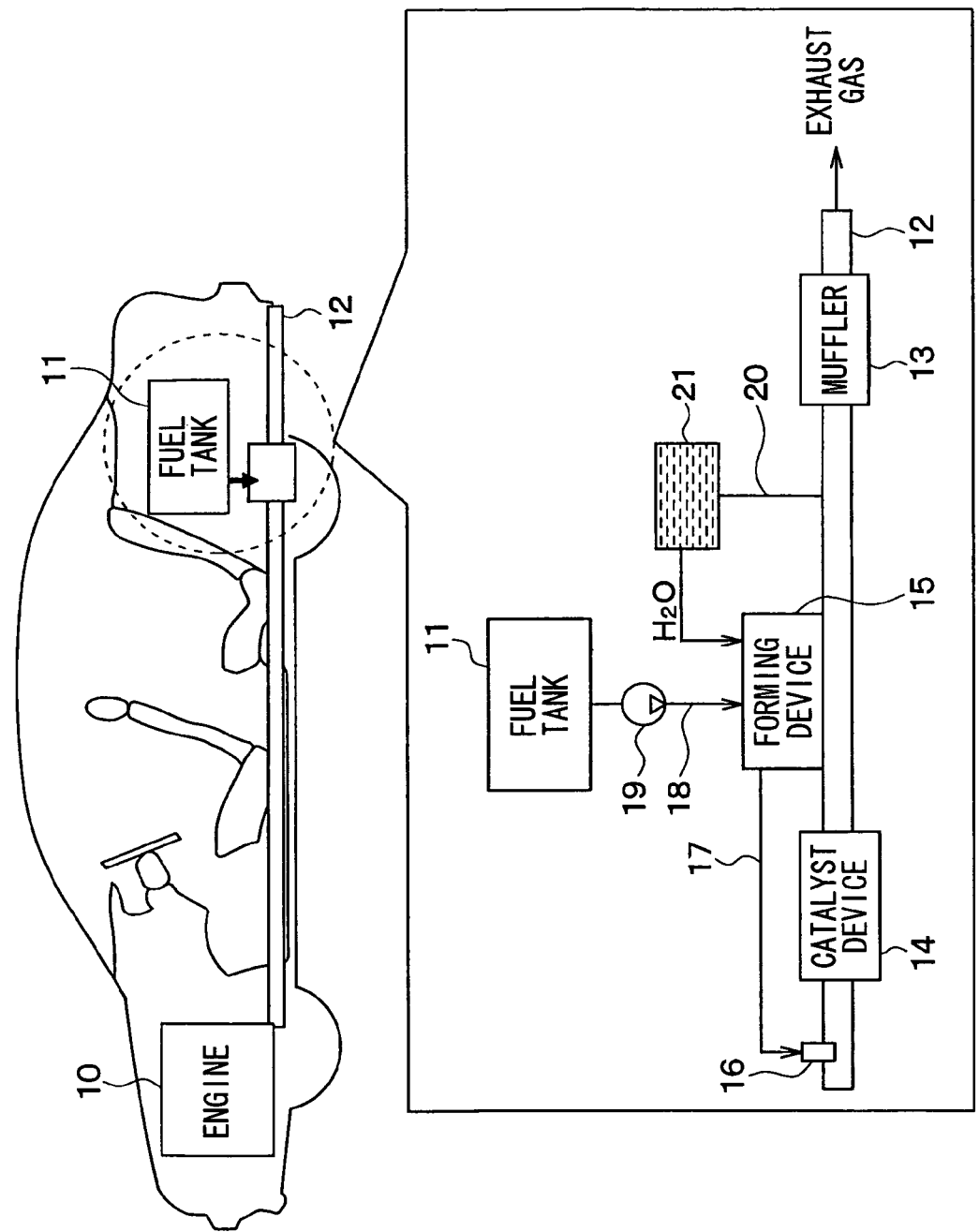
FIG. 1 is a schematic diagram of an exhaust gas control system of a first embodiment of the present invention.

FIG. 1 is a schematic diagram of an exhaust gas control system mounted to a vehicle, which is provided with a reforming device of the present invention. As shown in FIG. 1, the vehicle is mounted with an internal combustion engine 10, a fuel tank 11 filled with fuel for the internal combustion engine 10, and an exhaust gas passage 12 through which the exhaust gas of the internal combustion engine 10 passes.

An engine, in which an exhaust gas contains a large amount of oxygen, such as a lean burn engine and a diesel engine can be suitably used as the internal combustion engine 10. In this embodiment, a diesel engine is used as the internal combustion engine 10 and light oil is used as fuel for the internal combustion engine. The light oil contains mainly alicyclic hydrocarbon (naphthene base), aromatic hydrocarbon (aroma base), and straight-chain hydrocarbon (paraffin base). The fuel for the internal combustion engine corresponds to a raw material to be reformed.

The exhaust gas passage 12 is provided with a muffler 13 for muffling sound. Further, a reducing catalyst device 14 is provided in the exhaust gas passage 12 on the upstream side of the muffler 13 in an exhaust gas flow. The reducing catalyst device 14 is provided with a reducing catalyst for selectively reducing nitrogen oxide (NOx) contained in the exhaust gas. For example, a Ag-alumina-based catalyst can be used as the reducing catalyst.

A reducing agent forming device 15 is provided on a downstream side of the reducing catalyst device 14 and on an upstream side of the muffler 13 in the exhaust gas passage 12. In the reducing agent forming device 15, the fuel for the internal combustion engine is subjected to a reforming reaction to form a reducing agent for selectively reducing nitrogen oxide (NOx). This reducing agent is used for a reduction reaction in the reducing catalyst device 14. A reducing agent in this embodiment is hydrocarbon in which the carbon number of a main chain ranges from 8 to 12 and contains straight-chain hydrocarbon mainly and contains also hydrocarbon having a plurality of side chains comprising carbon and hydrogen. Light oil itself of the fuel acts as a reducing agent for selectively reducing nitrogen oxides although the light oil is low in reforming efficiency. For this reason, it is also possible to use the light oil (fuel) as a first reducing agent (reducing agent before reforming) and to use a reducing agent formed by the reforming reaction of the light oil as a second reducing agent (reducing agent after reforming), that is, to form the second reducing agent capable of causing a reduction reaction efficiently by reforming the first reducing agent.

A reducing agent supply part 16 for supplying a reducing agent formed in the reducing agent forming device 15 is provided on an upstream side of the reducing catalyst device 14 in the exhaust gas passage 12. The reducing agent supply part 16 is constructed as an injection nozzle for injecting the reducing agent. The reducing agent formed in the reducing agent forming device 15 is supplied to the reducing agent supply part 16 through a reducing agent passage 17. The reducing agent injected from the reducing agent supply part 16 is supplied to the reducing agent catalyst part 14 along with the exhaust gas and is used for a reduction reaction in the reducing agent catalyst part 14.

The fuel for the internal combustion engine 10 is supplied to the reducing agent forming device 15 from the fuel tank 11 through a fuel supply passage 18. The fuel supply passage 18 is provided with a fuel supply pump 19 for sending the fuel for the internal combustion engine from the fuel tank 11 to the reducing agent forming device 15. The fuel supply pump 19 may be operated by the use of a pump pressure for sending fuel to the internal combustion engine 10 or, for example, by an electric power supply from a battery (not shown).

The exhaust gas is introduced into the reducing agent forming device 15 through an exhaust gas branch passage 20. The exhaust gas branch passage 20 is provided with a trap part 21. The trap part 21 is, for example, a member that cools the exhaust gas by wind caused by the running vehicle to extract moisture contained in the exhaust gas. In this embodiment, moisture collected in the trap part 21 is supplied in a liquid state to the reducing agent forming device 15.

Figure 2:
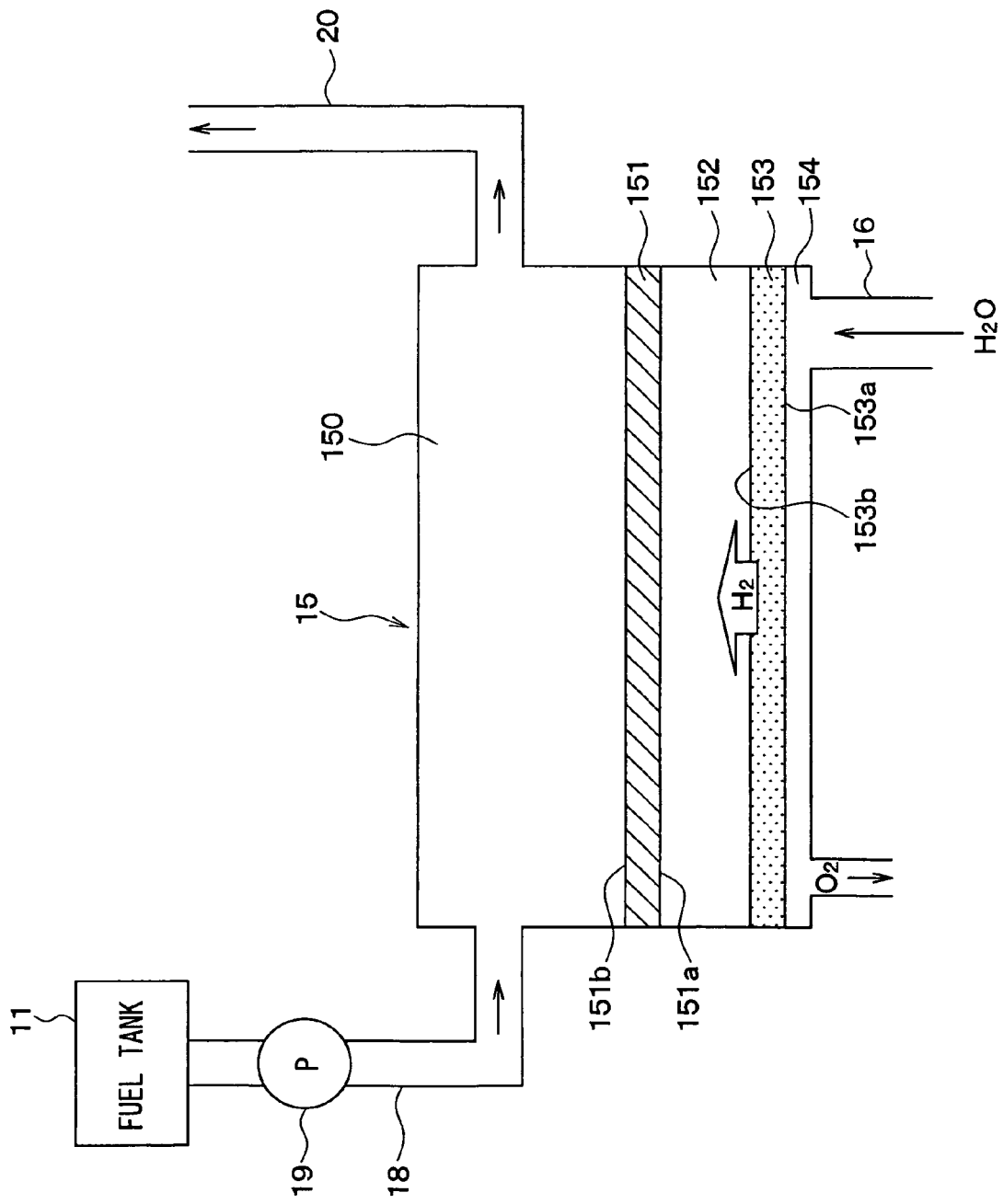
FIG. 2 is an enlarged diagram of a reducing agent forming device in FIG. 1.

FIG. 2 is an enlarged view of the reducing agent forming device 15. As shown in FIG. 2, the reducing agent forming device 15 is provided with a reforming part 150, a hydrogen permeable membrane 151, a hydrogen supply part 152, an electrolytic film 153, and a water supply part 154. The inside of the reducing agent forming device 15 is partitioned into the reforming part 150 and the hydrogen supply part 152 by the hydrogen permeable membrane 151, and is partitioned into the hydrogen supply part 152 and the water supply part 154 by the electrolytic film 153. The heat of the exhaust gas is transmitted to the reducing agent forming device 15 through the exhaust gas passage 12 as heating means, thereby the hydrogen permeable membrane 151 and the electrolytic film 153 are heated.

In the reforming part 150, the fuel is reformed, thereby a reducing agent for selectively reducing nitrogen oxides (NOx) is formed. The reforming of the fuel in this embodiment means the decomposition of fuel such as the depolymerization of the fuel. The reforming part 150 is provided with a dehydrogenation reaction part that dehydrogenates the fuel mainly to form unsaturated hydrocarbon and a depolymerization reaction part that depolymerizes the fuel mainly to reduce the carbon number of the fuel.

The fuel for the internal combustion engine is supplied to the reforming part 150 from the fuel tank 11 and moisture taken from the exhaust gas in the trap part 21 is supplied to the water supply part 154. In this embodiment, both of the fuel for the internal combustion engine and the moisture are supplied in a liquid state. Hydrogen formed through electrolysis by the electrolytic film 152 is supplied to the hydrogen supply part 152. The hydrogen supply part 152, the electrolytic film 153, and the water supply part 154 show a specific example of hydrogen supply means of this embodiment.

Figure 3:
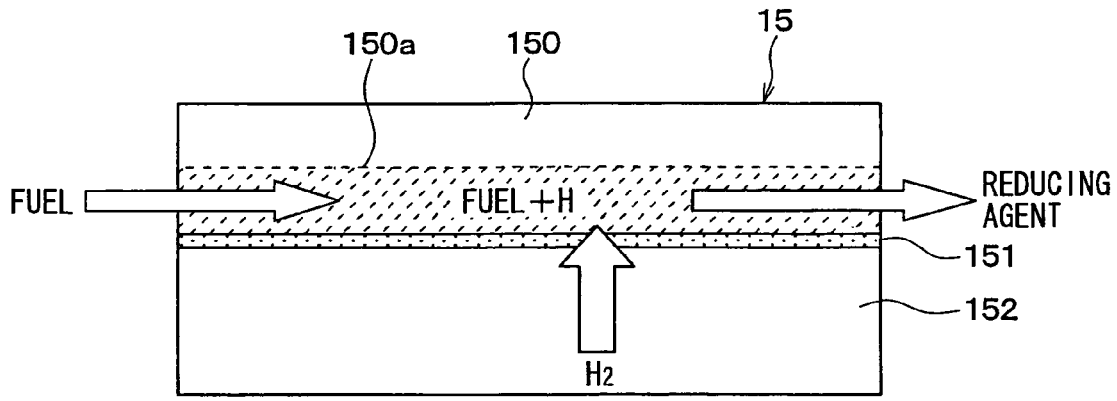
FIG. 3 is a schematic diagram of a reforming part of the reducing agent forming device.

FIG. 3 is a schematic diagram for explaining the reforming part 150 in detail. In FIG. 3, a region shown by broken diagonal lines shows a reforming reaction region 150a. While the reforming reaction proceeds in the whole region of the reforming part 150, the reforming reaction of the fuel is caused efficiently particularly in the reforming reaction region 150a. For example, the reforming reaction region 150a is close to a second surface 151b of the hydrogen permeable membrane 151 in the reforming part 150 and is a region within a sub-micron (e.g., 0.1 micron) from the surface of the second surface 151b. To proceed with the reforming reaction efficiently in the reforming part 150, it is preferable that the fuel for the internal combustion engine is supplied to the reforming reaction region 150a.

Returning to FIG. 2, the hydrogen permeable membrane 151 is constructed as a hydrogen dissociative permeable film that dissociates hydrogen, which is supplied to the hydrogen supply part 152 and is in a molecular state, into active hydrogen (hydrogen radical) in an atomic state on the surface of the first surface 151a and makes this active hydrogen permeate the hydrogen permeable membrane 151 to the second surface 151b to produce active hydrogen on the second surface 151b. With this, the active hydrogen is supplied to the reforming part 150.

Moreover, when the second surface 151b of the hydrogen permeable membrane 151 is increased in its surface area, the second surface 151b can increase the discharge of active hydrogen and can enhance the efficiency of the reforming reaction. For this reason, in this embodiment, the second surface 151b of the hydrogen permeable membrane 151 is formed into a curved surface, an uneven surface, or a wavy surface, thereby increasing its surface area. Moreover, the second surface 151b of the hydrogen permeable membrane 151 may be constructed of a plurality of surfaces.

The hydrogen permeable membrane 151 has only to be a film in which hydrogen in an atomic state can permeate between film constituent atoms (usually, metal). For example, a film constructed of an elemental substance of Pd, Ta, Nb, V, Ni, or Zr, or an alloy comprising one or more element selected from a group consisting of Pd, Ta, Nb, V, and Zr, and one or more element selected from a group consisting of Pt, Ag, Au, Rh, Ru, Sn, Se, Te, Si, Zn, In, Ir, Ni, Ti, Mo, Y, and Fe can be used as the hydrogen permeable membrane 151. Although the structure of the hydrogen dissociative permeable film may be crystalline or amorphous, considering the temperature of the exhaust gas, an amorphous hydrogen dissociative permeable film expected to be durable at low temperatures is preferable. Its film thickness can be, for example, from 0.01 mm to 0.1 mm.

The electrolytic film 153 is a proton permeable film and, for example, a solid polymeric electrolytic film can be used as the electrolytic film 153. The electrolytic film 153 is so constructed as to have electric current passed therethrough. Specifically, the electrolytic film 153 is sandwiched between a pair of electrodes (not shown) and the respective electrodes have voltage applied thereto from a battery (not shown) or the like. The electrolytic film 153 decomposes water supplied to the water supply part 154 on the first surface 153a through electrolysis and makes protons formed through this electrolysis permeate the electrolytic film 153 to the second surface 153b to produce hydrogen on the second surface 153b. With this, the hydrogen is supplied to the hydrogen supply part 152.

By adjusting a current value at the time of passing an electric current through the electrolytic film 153, the amount of hydrogen produced by the electrolytic film 153 can be adjusted and hence the amount of hydrogen supplied to the hydrogen supply part 152 can be adjusted. With this, the amount of hydrogen atoms permeating the hydrogen permeable membrane 151 can be adjusted and hence the amount of hydrogen atoms supplied to the reforming part 150 can be adjusted, thereby the reforming reaction in the reforming part 150 can be controlled.

Moreover, the solid polymeric electrolytic film used as the electrolytic film 153 can reduce the amount of moisture required to make the protons permeate the electrolytic film 153. For this reason, when the exhaust gas is supplied to the water supply part 154, the electrolytic film 153 is moistened by moisture in the exhaust gas, thereby being able to produce hydrogen in a short time from a start-up.

Figure 4:
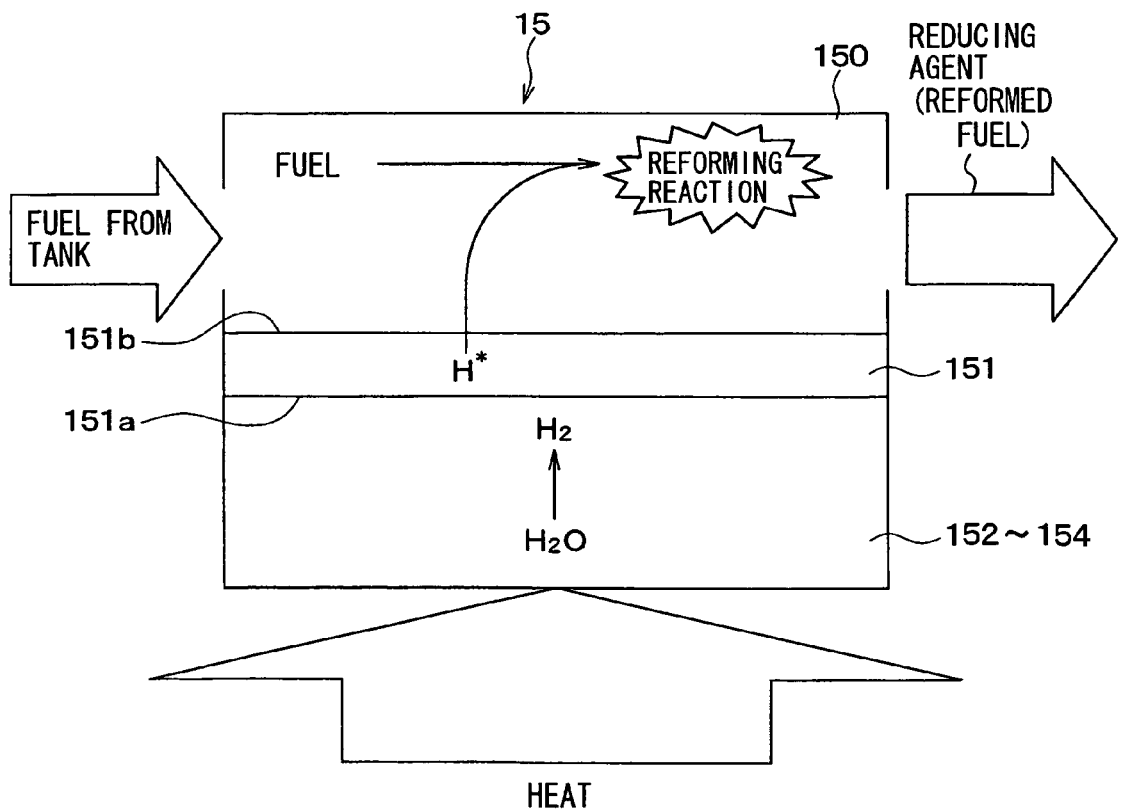
FIG. 4 is a schematic diagram for explaining an exhaust gas cleaning mechanism according to the exhaust gas control system of the first embodiment.

Next, the operation of the exhaust gas control system of this embodiment will be described by the use of FIG. 4. FIG. 4 is a schematic diagram for explaining the exhaust gas cleaning mechanism of the exhaust gas control system.

First, when the internal combustion engine 10 is started, supply of the fuel from the fuel tank 11 to the internal combustion engine 10 is started. The exhaust gas produced in the internal combustion engine 10 is passed through the exhaust gas passage 12 and has its sound muffled by the muffler 13 and then is discharged outside. The reducing catalyst device 14 and the reducing agent forming device 15 have their temperature raised by the heat of the exhaust gas passed through the exhaust gas passage 12. In this manner, when the temperature of the reducing catalyst device 14 is raised, reduction reaction efficiency in the reducing catalyst device 14 is enhanced, and when the temperature of the reducing agent forming device 15 is raised, hydrogen formation efficiency and reforming reaction efficiency in the reducing agent forming device 15 are enhanced. Here, the heating temperature of the reducing agent forming device 15 is set to be 100° C. or more.

At this time, the reducing agent forming device 15 is arranged on the downstream side of the reducing catalyst device 14 in the exhaust gas passage 12, so it is possible to raise the temperature of the reducing catalyst device 14 on a priority basis by the heat of the exhaust gas and then to raise the temperature of the reducing agent forming device 15. Further, to raise the temperature of the reducing catalyst to an active temperature, not only the exhaust heat of the exhaust gas but also combustion heat obtained by combusting the fuel can be used to heat the reducing agent. On this account, heat not yet to be used when the reducing catalyst is heated can be recovered by the reducing agent forming device 15 on the downstream side.

Moreover, the reducing agent forming device 15 is arranged on the upstream side of the muffler 13 in the exhaust gas passage 12, so the temperature of the reducing agent forming device 15 can be raised before the heat of the exhaust gas is removed by the muffler 13.

When the internal combustion engine 10 is started, supplying the fuel to the reforming part 150 of the reducing agent forming device 15 from the fuel tank 11 is started. Most part of the fuel (light oil) for the internal combustion engine supplied to the reforming part 150 is in a liquid state at the heating temperature of the reducing agent forming device 15 due to the exhaust heat of the exhaust gas. The reforming reaction of the fuel in the reforming part 15 is desirably developed in a state where the fuel is liquid but can be developed in a state where the fuel is in gaseous state. Moreover, moisture is taken out of the exhaust gas by the trap part 21 and the moisture is supplied to the water supply part 154 of the reducing agent forming device 15.

When the internal combustion engine 10 is started, passing the electric current through the electrolytic film 153 is started and water supplied to the water supply part 154 is decomposed into hydrogen and oxygen through electrolysis, thereby hydrogen is produced in the hydrogen supply part 152.

As shown in FIG. 4, hydrogen molecules produced in the hydrogen supply part 152 are dissociated into hydrogen atoms on the surface of the first surface 151a of the hydrogen permeable membrane 151 to produce active hydrogen (H.). The active hydrogen permeates the hydrogen permeable membrane 151 and active hydrogen is produced on the second surface 151b.

The active hydrogen reacts directly with the fuel for the internal combustion engine on the second surface 151b of the hydrogen permeable membrane 151 to reform the fuel for the internal combustion engine. In this reforming reaction are developed the dehydrogenation reaction in which the fuel is mainly dehydrogenated to form unsaturated hydrocarbon and the depolymerization reaction in which the fuel is mainly depolymerized to reduce the carbon number of the fuel. In this embodiment, when the fuel for the internal combustion engine is in a liquid state, the fuel for the internal combustion engine is subjected to the reforming reaction. However, even when the fuel for the internal combustion engine is in a gaseous state, the fuel for the internal combustion engine can be subjected to the reforming reaction.

In the reaction between the active hydrogen and the fuel for the internal combustion engine, straight-chain hydrocarbon is mainly formed. At this time, straight-chain hydrocarbon in which the carbon number of a main chain ranges from 8 to 12 is formed as a reducing agent (reformed fuel) not only by the reaction in which the bond between hydrocarbons each having a long main chain is cut but also by the reaction of opening the ring of cyclic hydrocarbon such as alicyclic hydrocarbon and aromatic hydrocarbon.

The reducing agent formed by the reforming part 150 is supplied to the nozzle of the reducing agent supply part 16 and is injected into the exhaust gas passage 12 from the nozzle. The reducing agent injected from the reducing agent supply part 16 is supplied to the reducing catalyst device 14 along with the flow of the exhaust gas and is used for the reduction reaction in the reducing catalyst device 14. In the reducing catalyst device 14, a selective reduction reaction for selectively reducing nitrogen oxide (NOx) by the hydrocarbon-based reducing agent is developed to clean the exhaust gas.

As described above, the fuel for the internal combustion engine is reformed to form the reducing agent, thereby the reducing agent for reducing nitrogen oxide in the exhaust gas can be obtained. This eliminates the need for supplying the reducing agent for the selective reduction reaction from the outside. Moreover, a tank or the like for holding the reducing agent can be set as required.

Moreover, in the exhaust gas control system of this embodiment, heat necessary for the reforming reaction at the time of forming the reducing agent from the fuel for the internal combustion engine is obtained from the exhaust gas of the internal combustion engine 10, so it is possible to make effective use of the exhaust heat of the exhaust gas and hence to enhance the efficiency of the entire system.

Moreover, since hydrogen atoms are supplied to the reforming part 150 by the use of the hydrogen permeable membrane 151, if temperature is higher than the operating temperature of the hydrogen permeable membrane 151, the hydrogen atoms can be supplied to the reforming part 150, thereby the fuel can be subjected to the reforming reaction in the reforming part 150. Further, since the hydrogen atoms are highly reactive, the hydrogen atoms can reform the fuel at low temperatures. Accordingly, even in the case of using the diesel engine having a low exhaust gas temperature, just as with this embodiment, the reducing agent can be formed by using the exhaust heat of the exhaust gas.

Further, when a site where hydrogen atoms are formed by the hydrogen permeable membrane 151 is separated from a site where the fuel is supplied, just as with this embodiment, if temperature is higher than the operating temperature of the hydrogen permeable membrane 151, the active hydrogen can be supplied to the reforming part 150 and the reforming part 150 can proceed with the reforming reaction.

Still further, when the hydrogen atoms are formed on the first surface 151a of the hydrogen permeable membrane 151 and the fuel is supplied to the second surface 151b on the opposite side, just as with this embodiment, a site where the fuel is supplied can be made different from a site where hydrogen atoms are formed and hence the fuel can be subjected to the reforming reaction in a state where the fuel is in a liquid phase.

Second Embodiment

Next, a second embodiment of the present invention will be described with reference to FIG. 5 and FIG. 6. As compared with the first embodiment, the second embodiment is different in that oxygen is supplied to the reforming part 150 of the reducing agent forming device 15. Hereinafter, only parts where the second embodiment is different from the first embodiment will be mainly described.

Figure 5:
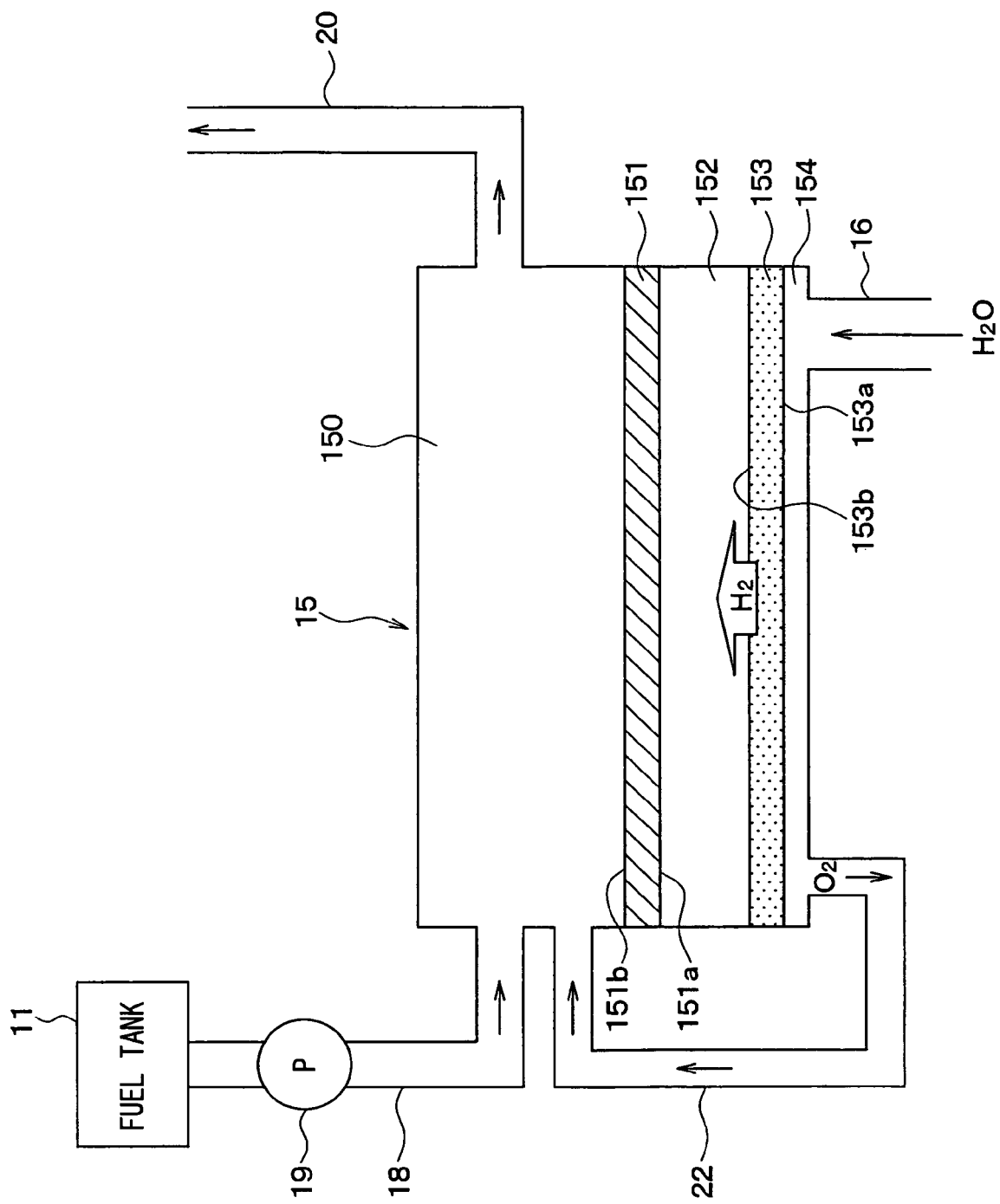
FIG. 5 is an enlarged diagram of a reducing agent forming device of a second embodiment of the present invention.

FIG. 5 is an enlarged view of the reducing agent forming device 15 of the second embodiment. FIG. 6 is a schematic diagram for describing an exhaust gas cleaning mechanism of the exhaust gas control system.

As shown in FIG. 5, in the reducing agent forming device 15 of the second embodiment, the water supply part 154 is connected to the reforming part 150 by an oxygen supply passage 22. Oxygen formed through electrolysis by the electrolytic film 152 is supplied to the reforming part 150 from the water supply part 154 via the oxygen supply passage 22. The reforming of the fuel in this embodiment means not only the depolymerization of the fuel but also the oxygenation of the fuel. Here, the oxygen supply passage 22 corresponds to oxygen supply means of the present invention.

The reforming part 150 of the second embodiment is provided with not only a dehydrogenation reaction part that dehydrogenates the fuel mainly to form unsaturated hydrocarbon and a depolymerization reaction part that depolymerizes the fuel mainly to reduce the carbon number of the fuel, but also an oxygenation reaction part that oxygenates the fuel to add oxygen to depolymerized hydrocarbon.

Figure 6:
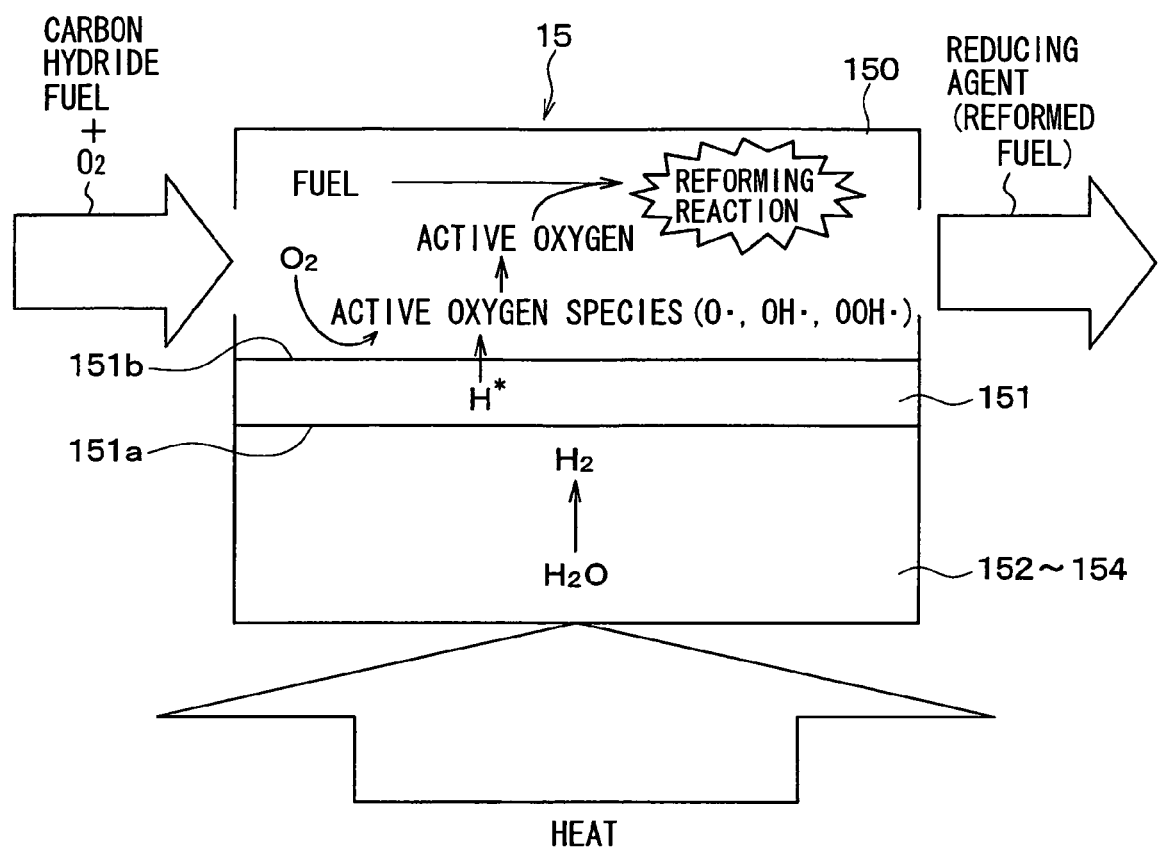
FIG. 6 is a schematic diagram for explaining an exhaust gas cleaning mechanism according to the exhaust gas control system of the second embodiment.

With this construction, as shown in FIG. 6, the active hydrogen reacts directly with the fuel for the internal combustion engine on the second surface 151b of the hydrogen permeable membrane 151 and also reacts with oxygen supplied to the reforming part 150 to form active oxygen species (O., OH., OOH., and the like) having higher oxidizing power. These active oxygen species have larger dissociation energy than the active hydrogen. That is, when oxygen is supplied to the reforming part 150, active species having large dissociation energy and large degradability can be obtained.

The reducing agent formed by the reforming part 150 of the second embodiment contains not only straight-chain hydrocarbon but also oxygenated hydrocarbon containing oxygen atoms such as alcohol, ethers, and ketones and, in particular, contains a large amount of methyl ketone ($CH_3$—CO—R) having a ketone group at the second carbon of straight-chain hydrocarbon. This oxygenated hydrocarbon has higher reduction efficiency than hydrocarbon not containing oxygen and hence can be used as an optimal reducing agent.

Moreover, since oxygen formed through electrolysis when hydrogen is formed is supplied to the reforming part 150, oxygen does not need to be supplied from the outside and hence construction can be made compact.

Further, in the second embodiment, oxygen supplied to the reforming part 150 has an oxygen concentration of nearly 100% and hence can be expected to be converted to active oxygen at high efficiency. These active oxygen species react with the fuel for the internal combustion engine to reform the fuel for the internal combustion engine. With this, in the second embodiment, not only straight-chain hydrocarbon but also oxygenated hydrocarbon containing oxygen can be formed.

Still further, oxygen supplied to the reforming part 150 has a high concentration of nearly 100% and hence the amount of oxygen to be supplied to the reforming part 150 has only to be a minimal amount required for the reforming reaction. On this account, the oxygen supply passage 22 for supplying oxygen to the reforming part 150 can be constructed slimly.

Third Embodiment

Next, a third embodiment of the present invention will be described with reference to FIG. 7 to FIG. 12. As compared with the first embodiment, this third embodiment is different mainly in hydrogen supply means. Hereinafter, only parts where the third embodiment is different from the first embodiment will be mainly described.

Figure 7:
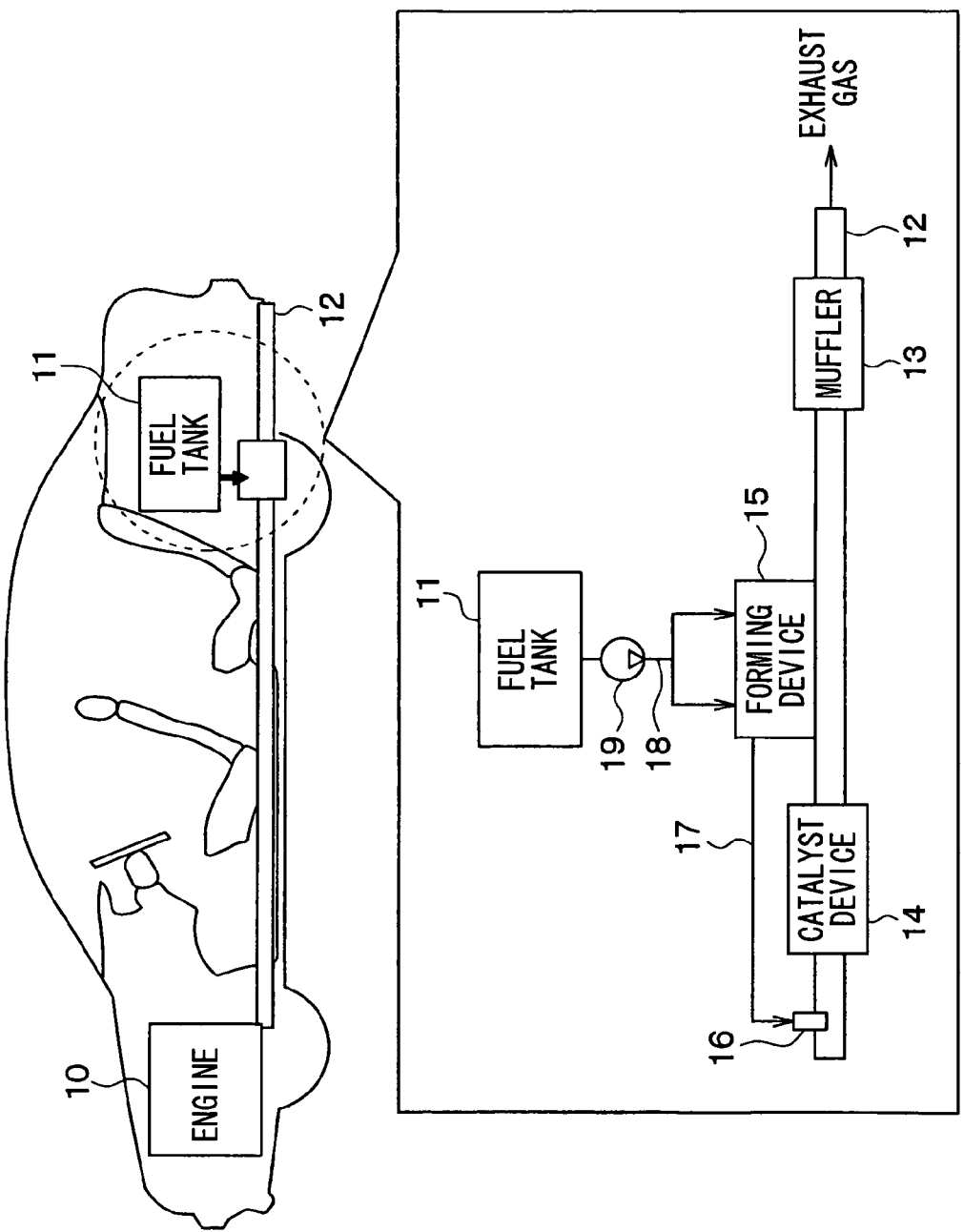
FIG. 7 is a schematic diagram of an exhaust gas control system of a third embodiment of the present invention.
Figure 8:
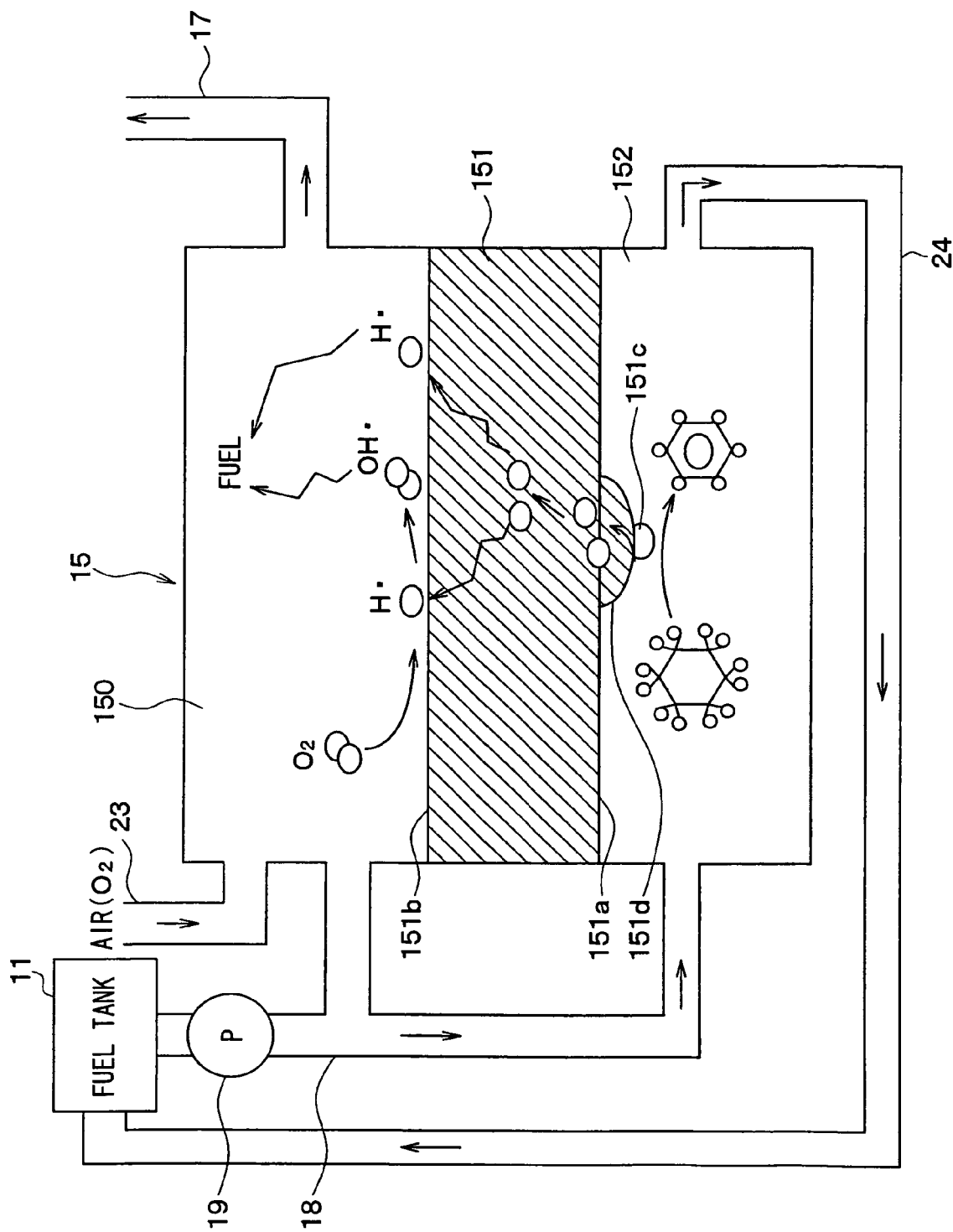
FIG. 8 is an enlarged diagram of a reducing agent forming device in FIG. 7.

FIG. 7 is a schematic diagram of an exhaust gas control system mounted on a vehicle in this third embodiment, and FIG. 8 is an enlarged view of the reducing agent forming device 15 in FIG. 7.

This third embodiment is not constructed so as to introduce moisture contained in the exhaust gas into the reducing agent forming device 15, which is different from the above-described respective embodiments, and the reducing agent forming device 15 is not provided with the electrolytic film 153 and the water supply part 154.

As shown in FIG. 7 and FIG. 8, this third embodiment is constructed in such a way that the fuel for the internal combustion engine is supplied to the reforming part 150 and the hydrogen supply part 152 from the fuel tank 11. Moreover, this third embodiment is constructed in such a way that air containing oxygen is supplied to reforming part 150 from the outside through an air supply passage 23. Here, the air supply passage 23 constructs the oxygen supply means of the present invention.

Hydrogen forming catalysts 151c for forming hydrogen from the fuel for the internal combustion engine are carried on the first surface 151a of the hydrogen permeable membrane 151. As the hydrogen forming catalysts 151c can be used, for example, Pt, Pd, Ni, Cu, or the like. Here, a fuel supply passage 18 and the hydrogen forming catalysts 151c correspond to hydrogen supply means of this embodiment.

Figure 9:
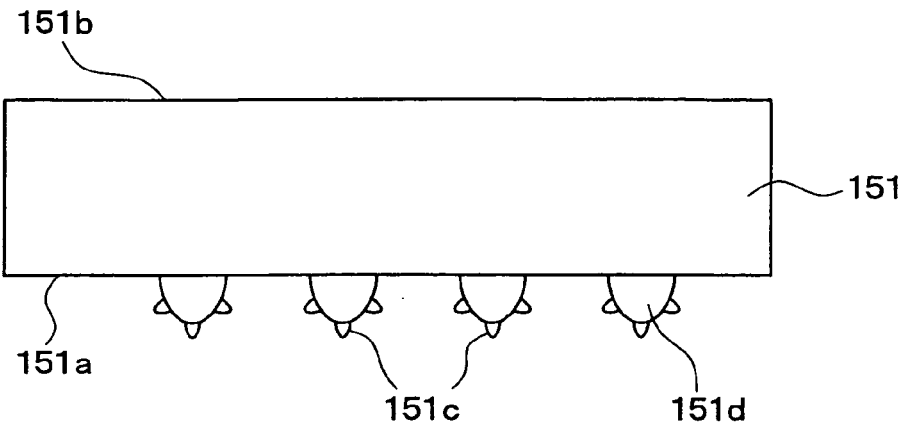
FIG. 9 is a schematic diagram of a hydrogen dissociative permeable film in FIG. 8.

FIG. 9 is a schematic diagram of the hydrogen permeable membrane 151. The hydrogen forming catalysts 151c, as shown in FIG. 9, are formed in such a way as to be diffused and carried in fine particles on the catalyst carriers 151d constructed on the surface of the first surface 151a. The catalyst carriers 151d can be constructed, for example, as metal oxide constructing the hydrogen permeable membrane 151.

Figure 10:
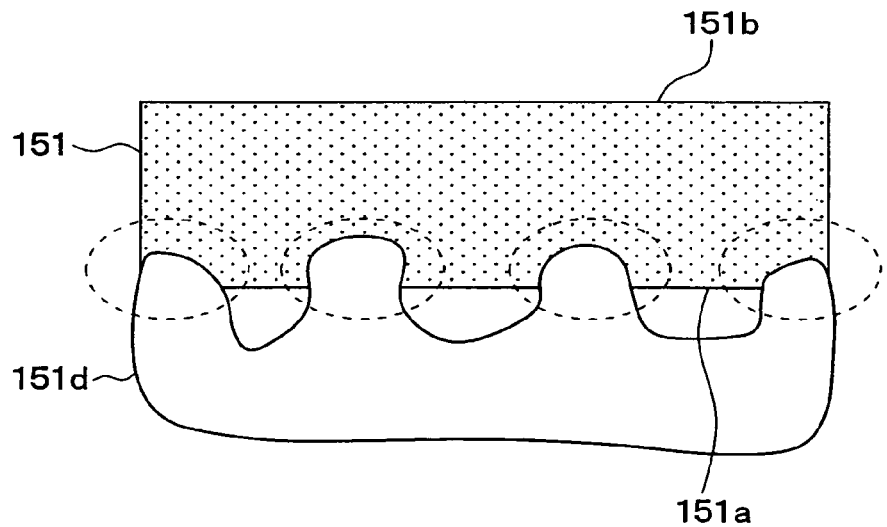
FIG. 10 is a schematic diagram for explaining the construction of a catalyst carrier.

FIG. 10 is a schematic diagram for explaining the construction of the catalyst carrier 151d. As shown in FIG. 10, in this embodiment, the catalyst carriers 151d are constructed integrally with the hydrogen permeable membrane 151. A metal oxide made by chemically combining metal (for example, Zr, Al, Ni, or the like) constructing the hydrogen permeable membrane 151 with oxygen is grown on the surface of the hydrogen permeable membrane 151 to form the catalyst carriers 151d. Alternatively, the hydrogen permeable membrane 151 may be formed on the catalyst carriers 151d as metal oxide. The film thickness of the catalyst carrier 151d has only to be from about several tens nm to several nm.

According to the catalyst carriers 151d of this structure, a continuous crystalline structure can be obtained between the catalyst carriers 151d and the hydrogen permeable membrane 151 and hence the hydrogen permeable membrane 151 and the catalyst carriers 151d can be formed as an integrated continuous substance. Each of portions surrounded by broken lines in FIG. 10 shows a portion where the hydrogen permeable membrane 151 and the catalyst carrier 151d are integrated with each other. With this, as compared with a case where the catalyst carriers 151d constructed as substances separate from the hydrogen permeable membrane 151 are joined to the surface of the hydrogen permeable membrane 151, the catalyst carriers 151d are hard to separate from the hydrogen permeable membrane 151 and hence strength can be enhanced.

Figure 11:
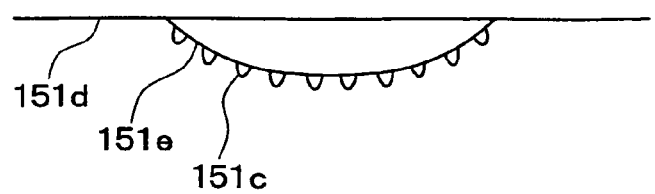
FIG. 11 is an enlarged diagram to show the surroundings of catalysts when a promoter is provided.

The hydrogen forming catalysts 151c may be used as single substances or may be used along with promoters for promoting the catalytic reaction (hydrogen forming reaction) by the hydrogen forming catalysts 151c. For example, when Pt is used as the hydrogen forming catalyst 151c, Pd can be used as the promoters. FIG. 11 is an enlarged view to show the surroundings of the catalysts when the promoter 151e is provided. Both of the hydrogen forming catalysts 151c and the promoters 151e are carried on each of the catalyst carriers 151d. As shown in FIG. 11, the promoter 151e can be directly carried on the catalyst carrier 151d and the hydrogen forming catalysts 151c can be carried on the promoter 151e. Alternatively, the hydrogen forming catalysts 151c and the promoter 151e may be directly carried on the catalyst carrier 151d.

On the surface of the first surface 151a of the hydrogen permeable membrane 151, alicyclic hydrocarbon (for example, cyclohexane) contained in the fuel for the internal combustion engine is converted to aromatic hydrocarbon (for example, benzene) by the hydrogen forming catalysts 151c. When the alicyclic hydrocarbon is converted to aromatic hydrocarbon, hydrogen is formed. This hydrogen is in an atomic state and hence hydrogen atoms are supplied to the first surface 151a of the hydrogen permeable membrane 151.

Hydrogen formed on the first surface 151a of the hydrogen permeable membrane 151 permeates the hydrogen permeable membrane 151 as active hydrogen in an atomic state to produce active hydrogen on the second surface 151b. The fuel for the internal combustion engine containing aromatic hydrocarbon converted from the alicyclic hydrocarbon is return to the fuel tank 11 through a fuel return passage 24.

According to this embodiment, by providing the first surface of the hydrogen permeable membrane 151 with the catalysts 151c having a high hydrogen forming capability, hydrogen can be formed on the surface of the hydrogen permeable membrane 151 from the fuel for the internal combustion engine. With this, hydrogen can be formed on the first surface 151a of the hydrogen permeable membrane 151 and the reforming of the fuel for the internal combustion engine can be realized on the second surface 151b, which can eliminate the need for electrolytic film 153 (refer to FIG. 2) for decomposing water through electrolysis and the need for electric power for driving the electrolytic film 153 and hence can make the reducing agent forming device 15 compact.

Fourth Embodiment

Next, a fourth embodiment of the present invention will be described with reference to FIG. 12 and FIG. 13. As compared with the third embodiment, this fourth embodiment is different mainly in a place where the reducing agent forming device 15 is set. Hereinafter, only parts where the fourth embodiment is different from the respective embodiments will be mainly described.

Figure 12:
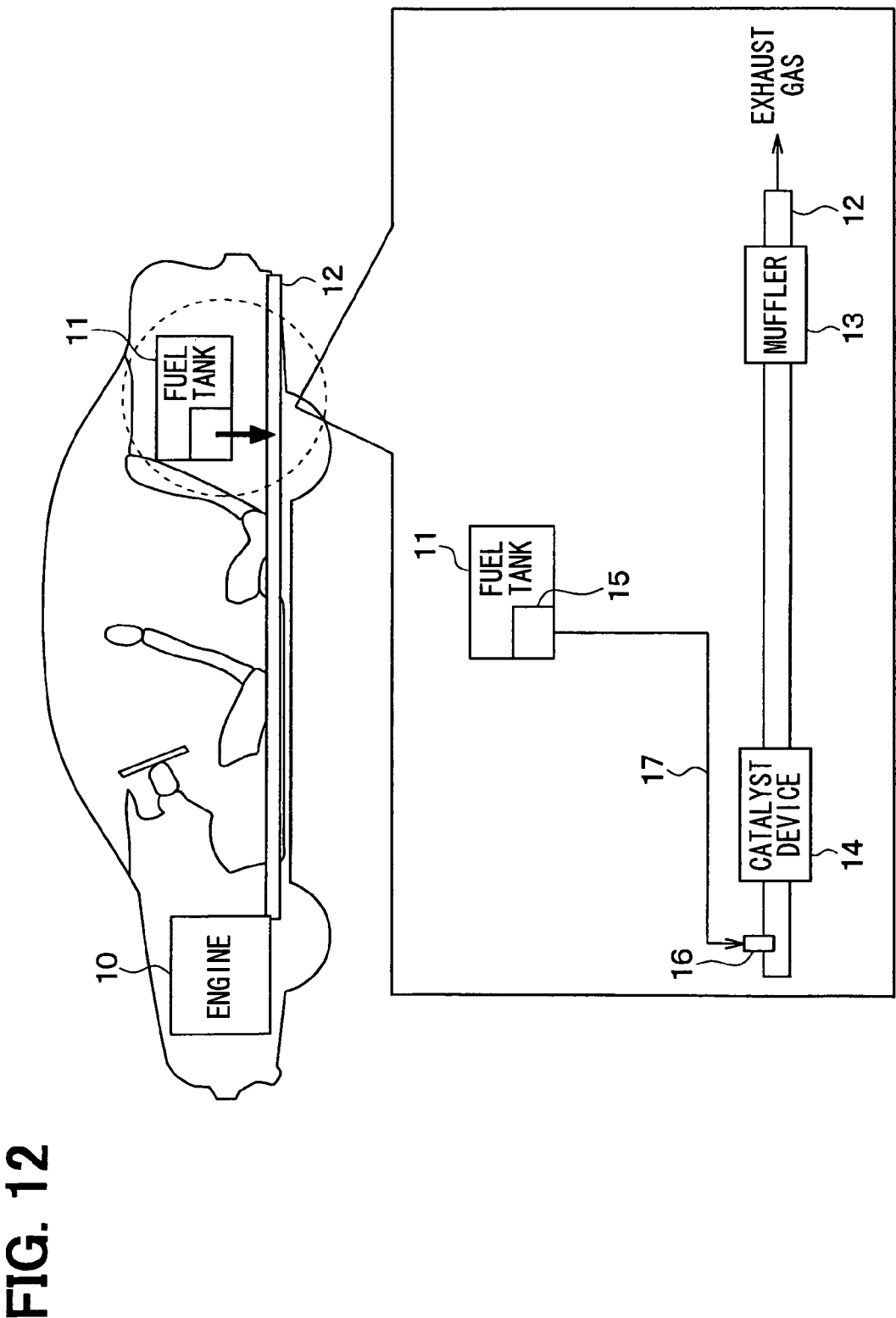
FIG. 12 is a schematic diagram of an exhaust gas control system mounted to a vehicle according to a fourth embodiment of the present invention.
Figure 13:
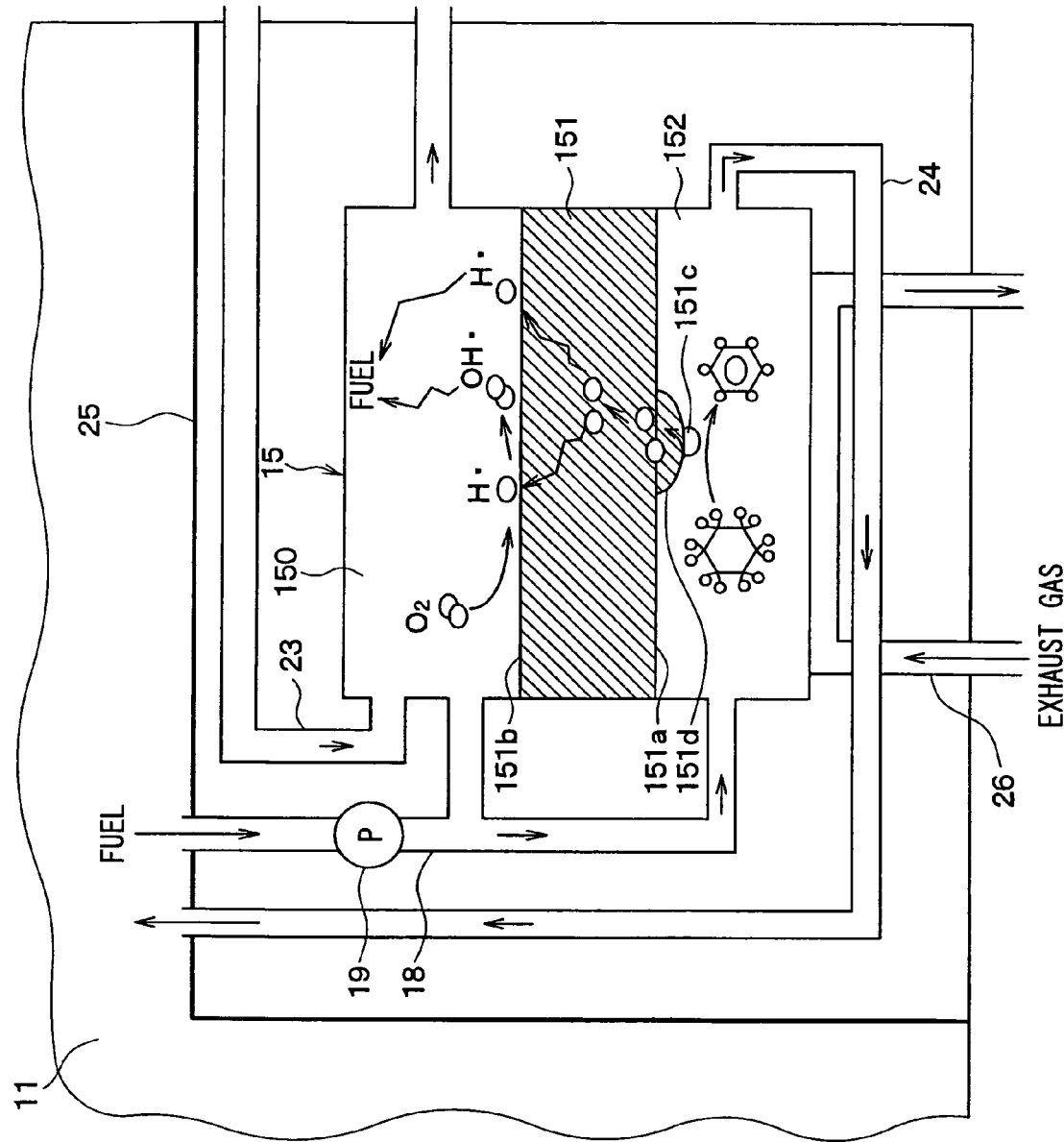
FIG. 13 is an enlarged diagram of a reducing agent forming device in FIG. 12.

FIG. 12 is a schematic diagram of a vehicle mounted with an exhaust gas control system of this fourth embodiment, and FIG. 13 is an enlarged view of the reducing agent forming device 15 in FIG. 12.

As shown in FIG. 12, in this fourth embodiment, the reducing agent forming device 15 is set in the fuel tank 11. The reducing agent forming device 15 is housed in a case 25 located in the fuel tank 11. Piping 17, 18, 23, and 24 connected to the reducing agent forming device 15 and a fuel supply pump 19 are also housed in the case 25.

Moreover, an exhaust gas introducing passage 26 for introducing exhaust gas from the exhaust gas passage 12 is provided in the case 25. The exhaust gas introducing passage 26 is provided so as to branch from the exhaust gas passage 12 and to have its part put into contact with the reducing agent forming device 15. The exhaust gas passes through the exhaust gas introducing passage 26, thereby the reducing agent forming device 15 is heated by the exhaust heat of the exhaust gas. For example, the case 25 has a thermal insulating structure in such a way that heat when the reducing agent forming device 15 is heated is not transmitted to the fuel in the fuel tank 11. Here, the exhaust gas introducing passage 26 corresponds heating means in this embodiment.

The above-described construction can shorten the length of piping 18, 24 for connecting the fuel tank 11 and the reducing agent forming device 15 and can provide the advantage of reducing also the power of the pump 19 for sending fuel to the reforming part 150 of the reducing agent forming device 15. While the reducing agent forming device 15 is set in the fuel tank 11 in the example shown in FIG. 12 and FIG. 13, the reducing agent forming device 15 may be set at a site next to the fuel tank 11 outside the fuel tank 11.

Next, experiment examples conducted to examine the effect of the above-described embodiments will be described.

First Example

A first experiment example is performed in the structure of the first embodiment. In the first experiment example, a pipe made of 100% Pd was used as a hydrogen permeable membrane 151. Three kinds of simulation light oils were supplied as fuel for the internal combustion engine from the upstream side of the hydrogen permeable membrane 151.

Simulation light oil A: n-hexadecane simple substance

Simulation light oil B: mixed liquid of n-tridecane and n-hexadecane (1:1)

Simulation light oil C: mixed liquid of n-tridecane, n-hexadecane, and naphthalene (2:2:1)

The results of the rate of formation of a reducing agent are shown in FIG. 14. The heating temperatures of the reducing agent forming device 15 were set at 140° C. and 200° C. for the simulation light oil A and at 200° C. for the simulation light oils B and C. Hydrogen of 1 atmospheric pressure was supplied to the hydrogen supply part 152 at a rate of 10 cc/min. Nitrogen was bubbled into the fuel for the internal combustion engine to expel dissolved oxygen. The results of the rate of formation of the reducing agent by the reforming reaction were $0.64 \times 10^{-4}$ [ml/min/cm$^2$] at 140° C. and 2.0×

$10^{-4}$ [ml/min/cm$^2$] at 200° C. for the simulation light oil A, so the rate of formation of the reducing agent was brought to about three times by raising temperature. Moreover, the results of the rate of formation of the reducing agent by the reforming reaction were $0.91 \times 10^{-4}$ [ml/min/cm$^2$] and $0.8 \times 10^{-4}$ [ml/min/cm$^2$] for the simulation light oils B and C, respectively.

Second Example

A second experiment example is performed in the structure of the second embodiment. The second experiment example was different from the first experiment example in that oxygen (supply gas) was bubbled into the fuel for the internal combustion engine. The result of the second experiment example is shown in FIG. 15.

The heating temperatures of the reducing agent forming device 15 were set at 140° C. and 200° C. for the simulation light oil A and at 200° C. for the simulation light oils B and C. Hydrogen of 1 atmospheric pressure was supplied to the hydrogen supply part 152 at a rate of 10 cc/min. The results of rate of formation of the reducing agent by the reforming reaction were $1.1 \times 10^{-4}$ [ml/min/cm$^2$] at 140° C. and $6.4 \times 10^{-4}$ [ml/min/cm$^2$] at 200° C. for the simulation light oil A, so the rate of formation was brought to about six times by raising temperature. Moreover, the results of rate of formation of the reducing agent by the reforming reaction were $4.3 \times 10^{-4}$ [ml/min/cm$^2$] and $2.5 \times 10^{-4}$ [ml/min/cm$^2$] for the simulation light oils B and C, respectively. It was examined that a large rate of formation of a reducing agent could be obtained.

Other Embodiments

Although the present invention has been fully described in connection with the preferred embodiments thereof with reference to the accompanying drawings, it is to be noted that various changes and modifications will become apparent to those skilled in the art.

For example, in the above-described embodiments, the reforming device and the exhaust gas control system according to the present invention are typically used for a vehicle having an internal combustion engine. However, the reforming device and the exhaust gas control system according to the present invention can be suitably used for an internal combustion engine (for example, plant or thermal power plant) containing a large amount of oxygen in the exhaust gas.

Moreover, in the above-described embodiments, the reforming device according to the present invention is applied to the exhaust gas control system and the reducing agent formed by the reforming device is used for selectively reducing nitrogen oxide contained in the exhaust gas of the internal combustion engine. However, the reforming device according to the present invention may be used for usage other than an exhaust gas control system.

Further, the above-described embodiments are constructed in such a way that the reducing agent forming device 15 is arranged in the exhaust gas passage 12 and is heated by the heat of the exhaust gas. However, the reducing agent forming device 15 may be heated by other heating means. For example, it is possible to adopt a construction in which a cooling water pipe through which the cooling water of the internal combustion engine 10 is passed is used as heating means and in which the reducing agent forming device 15 is heated by the use of the heat of the cooling water. In addition, an electric heater may be used as the heating means.

Still further, the above-described embodiment is constructed in such a way that moisture extracted from the exhaust gas by the trap part 21 is supplied to the water supply part 154 of the reducing agent forming device 15. However, the exhaust gas in the state of containing moisture may be directly introduced into the water supply part 154 of the reducing agent forming device 15.

Still further, the second embodiment is constructed in such a way that pure oxygen is supplied to the reforming part 150 and the third embodiment is constructed in such a way that air containing oxygen molecules is supplied to the reforming part 150. However, the substance to be supplied to the reforming part 150 by the oxygen supply means has only to be able to produce oxygen molecules in the reforming part 150 and, for example, liquid containing permanganate or hydrogen peroxide can be used as the substance.

Furthermore, in the above-described first and second embodiments, the reducing agent forming device 15 may be provided in the fuel tank 15, similarly to the fourth embodiment.

Such changes and modifications are to be understood as being within the scope of the present invention as defined by the appended claims.

What is claimed is:
1. A reducing agent forming device comprising:
a reforming part that subjects a hydrocarbon-based raw material to be reformed to a reforming reaction to form a reducing agent to be supplied to a reducing catalyst part for reducing nitrogen oxide selectively;
an inlet for flowing raw material into said reforming part;
an outlet for flowing the reducing agent to the reducing catalyst part; and
a hydrogen permeable membrane for supplying hydrogen atoms to the reforming part, the hydrogen permeable membrane having a first surface and a second surface; and
a hydrogen supply means for supplying hydrogen molecules to the first surface of the hydrogen permeable membrane, the hydrogen supply means having an electrolytic film through which electric current passes and water supply means for supplying water to a first surface of the electrolytic film, wherein
the reforming part has a reforming reaction region through which the raw material to be reformed passes and is reacted with the hydrogen atoms supplied by the hydrogen permeable membrane so as to be reformed to the reducing agent,
the hydrogen permeable membrane dissociates the hydrogen molecules supplied to the first surface from the hydrogen supply means into hydrogen atoms and makes the hydrogen atoms permeate from the first surface to the second surface to produce the hydrogen atoms on the second surface,
the electrolytic film has said first surface and a second surface opposite thereto, the second surface of the electrolytic film faces the first surface of the hydrogen permeable membrane, and
when electric current is passed through the electrolytic film, the water supplied from the water supply means is decomposed on the first surface of the electrolytic film through electrolysis to produce hydrogen molecules on the second surface of the electrolytic film and the hydrogen molecules are supplied to the first surface of the hydrogen permeable membrane.

2. The reducing agent forming device as in claim 1, wherein the reforming reaction region is within a range of sub-micron from the second surface of the hydrogen permeable membrane.

3. The reducing agent forming device as in claim 1, further comprising
a raw material supply unit for supplying the raw material to be reformed to the first surface of the hydrogen permeable membrane,
wherein the first surface of the hydrogen permeable membrane is provided with a hydrogen forming catalyst for forming hydrogen from the raw material to be reformed and a catalyst carrier for carrying the hydrogen forming catalyst.

4. The reducing agent forming device as in claim 3, further comprising
a promoter for promoting hydrogen formation by the hydrogen forming catalyst, wherein the promoter is provided on the first surface of the hydrogen permeable membrane.

5. The reducing agent forming device as in claim 3, wherein the hydrogen forming catalyst is diffused and carried in fine particles on the catalyst carrier.

6. The reducing agent forming device as in claim 5, wherein the catalyst carrier is made of a metal oxide formed by chemically combining constituent metal of the hydrogen permeable membrane with oxygen.

7. The reducing agent forming device as in claim 6, wherein the hydrogen permeable membrane is formed integrally with the catalyst carrier.

8. The reducing agent forming device as in claim 1, further comprising
an oxygen supply means for supplying oxygen into the reforming part.

9. The reducing agent forming device as in claim 1, further comprising
an oxygen supply means for supplying the reforming part with oxygen, wherein the oxygen supply means is constructed so as to supply oxygen formed through the electrolysis to the reforming part.

10. A reducing agent forming device comprising:
a reforming part that subjects a hydrocarbon-based raw material to be reformed to a reforming reaction to form a reducing agent to be supplied to a reducing catalyst part for reducing nitrogen oxide selectively;
an inlet for flowing raw material into said reforming part;
an outlet for flowing the reducing agent to the reducing catalyst part;
an oxygen supply means for supplying oxygen to the reforming part; and
a hydrogen permeable membrane for supplying hydrogen atoms to the reforming part, the hydrogen permeable membrane having a first surface and a second surface; and
a hydrogen supply means for supplying hydrogen molecules to the first surface of the hydrogen permeable membrane, the hydrogen supply means having an electrolytic film through which electric current passes and water supply means for supplying water to a first surface of the electrolytic film,
wherein the reforming part has a reforming reaction region through which the raw material to be reformed passes and is reacted with the hydrogen atoms and the oxygen so as to be reformed to the reducing agent,
the hydrogen permeable membrane dissociates the hydrogen molecules supplied to the first surface from the hydrogen supply means into hydrogen atoms and makes the hydrogen atoms permeate from the first surface to the second surface to produce the hydrogen atoms on the second surface,
the electrolytic film has said first surface and a second surface opposite thereto, the second surface of the electrolytic film faces the first surface of the hydrogen permeable membrane, and
when electric current is passed through the electrolytic film, the water supplied from the water supply means is decomposed on the first surface of the electrolytic film through electrolysis to produce hydrogen molecules on the second surface of the electrolytic film and the hydrogen molecules are supplied to the first surface of the hydrogen permeable membrane.

11. An exhaust gas control system for an internal combustion engine, the system comprising:
an exhaust gas passage through which exhaust gas exhausted from the engine flows;
a reducing catalyst part, located in the exhaust gas passage, for selectively reducing nitrogen oxide in the exhaust gas;
a reforming part that subjects fuel used for the engine to a reforming reaction to form a reducing agent to be supplied to the reducing catalyst;
an inlet passage for flowing fuel into the reforming part;
an outlet passage for flowing reducing agent to the reducing catalyst part in the exhaust gas passage,
a hydrogen permeable membrane for supplying hydrogen atoms to the reforming part, the hydrogen permeable membrane having a first surface and a second surface; and
a hydrogen supply means for supplying hydrogen molecules to the first surface of the hydrogen permeable membrane, the hydrogen supply means having an electrolytic film through which electric current passes and water supply means for supplying water to a first surface of the electrolytic film, wherein
the reforming part has a reforming reaction region through which the fuel to be reformed passes and is reacted with the hydrogen atoms supplied by the hydrogen permeable membrane so as to be reformed to the reducing agent,
the hydrogen permeable membrane dissociates the hydrogen molecules supplied to the first surface from the hydrogen supply means into hydrogen atoms and makes the hydrogen atoms permeate from the first surface to the second surface to produce the hydrogen atoms on the second surface,
the electrolytic film has said first surface and a second surface opposite thereto, the second surface of the electrolytic film faces the first surface of the hydrogen permeable membrane,
the water supply means supplies moisture contained in the exhaust gas of the internal combustion engine to the first surface of the electrolytic film, and
when electric current is passed through the electrolytic film, the water supplied from the water supply means is decomposed on the first surface of the electrolytic film through electrolysis to produce hydrogen molecules on the second surface of the electrolytic film and the hydrogen molecules are supplied to the first surface of the hydrogen permeable membrane.

12. The exhaust gas control system as in claim 11, wherein the reforming part is arranged in a fuel tank in which the fuel for the internal combustion engine is stored, or next to the fuel tank.

13. The exhaust gas control system as in claim 11, further comprising a heating means for heating the hydrogen permeable membrane.

14. The exhaust gas control system as in claim 13, wherein the heating means heats the hydrogen permeable membrane by using the exhaust gas.

15. The exhaust gas control system as in claim 13, wherein the heating means is a cooling water piping, through which cooling water for cooling the internal combustion engine passes, and heats the hydrogen permeable membrane by using the cooling water.

16. The exhaust gas control system as in claim 11, further comprising
a muffler for muffling sound in the exhaust gas passage,
wherein the reforming part and the hydrogen permeable membrane are arranged on a downstream side of the reducing catalyst and on an upstream side of the muffler.

17. An exhaust gas control system for an internal combustion engine, the system comprising:
an exhaust gas passage through which exhaust gas exhausted from the engine flows;
a reducing catalyst part, located in the exhaust gas passage, for selectively reducing nitrogen oxide in the exhaust gas;
a reforming part that subjects fuel used for the engine to a reforming reaction to form a reducing agent to be supplied to the reducing catalyst;
an inlet passage for flowing fuel into the reforming part;
an outlet passage for flowing reducing agent to the reducing catalyst part in the exhaust gas passage,
an oxygen supply means for supplying oxygen to the reforming part;
a hydrogen permeable membrane for supplying hydrogen atoms to the reforming part, the hydrogen permeable membrane having a first surface and a second surface; and
a hydrogen supply means for supplying hydrogen molecules to the first surface of the hydrogen permeable membrane, the hydrogen supply means having an electrolytic film through which electric current passes and water supply means for supplying water to a first surface of the electrolytic film,
wherein the reforming part has a reforming reaction region through which the fuel to be reformed passes and is reacted with the hydrogen atoms and the oxygen so as to be reformed to the reducing agent,
the hydrogen permeable membrane dissociates the hydrogen molecules supplied to the first surface from the hydrogen supply means into hydrogen atoms and makes the hydrogen atoms permeate from the first surface to the second surface to produce the hydrogen atoms on the second surface,
the electrolytic film has said first surface and a second surface opposite thereto,
the second surface of the electrolytic film faces the first surface of the hydrogen permeable membrane,
the water supply means supplies moisture contained in the exhaust gas of the internal combustion engine to the first surface of the electrolytic film, and
when electric current is passed through the electrolytic film, the water supplied from the water supply means is decomposed on the first surface of the electrolytic film through electrolysis to produce hydrogen molecules on the second surface of the electrolytic film and the hydrogen molecules are supplied to the first surface of the hydrogen permeable membrane.

* * * * *